United States Patent
Held

(12) 
(10) Patent No.: US 6,274,106 B1
(45) Date of Patent: Aug. 14, 2001

(54) OXIDE GAS ABSORBING ARRANGEMENT AND METHOD

(75) Inventor: Wolfgang Held, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/314,204

(22) Filed: May 19, 1999

Related U.S. Application Data

(62) Division of application No. 09/252,506, filed as application No. PCT/EP97/04306 on Aug. 7, 1997.

(30) Foreign Application Priority Data

Aug. 19, 1996 (DE) ................................................ 196 33 050

(51) Int. Cl.[7] .............................. B01J 8/02; C01B 17/90; C01B 21/20
(52) U.S. Cl. .......................... 423/213.2; 60/297; 60/300; 60/301; 423/239.1; 423/244.02
(58) Field of Search ............... 60/297, 300, 301, 60/311; 423/212, 213.2, 239.1, 244.02

(56) References Cited

U.S. PATENT DOCUMENTS

| | | | |
|---|---|---|---|
| 4,755,499 | 7/1988 | Neal et al. ........................ | 502/415 |
| 4,849,274 | 7/1989 | Cornelison ........................ | 428/116 |
| 5,240,682 | * 8/1993 | Cornelison ........................ | 422/174 |
| 5,362,463 | 11/1994 | Stiles et al. ...................... | 423/239.1 |
| 5,388,406 | * 2/1995 | Takeshima ........................ | 60/297 |
| 5,402,641 | * 4/1995 | Katoh .............................. | 60/285 |
| 5,406,790 | 4/1995 | Hirota et al. ..................... | 60/276 |
| 5,607,650 | 3/1997 | Debbage et al. .................. | 422/178 |
| 5,633,217 | 5/1997 | Lynn ............................... | 502/439 |
| 5,702,675 | 12/1997 | Takeshima et al. ............... | 423/213.5 |

FOREIGN PATENT DOCUMENTS 6200738  7/1994  (JP) ................................. F01N/3/08

* cited by examiner

Primary Examiner—Steven P. Griffin
Assistant Examiner—Maribel Medina
(74) Attorney, Agent, or Firm—Baker Botts LLP

(57) ABSTRACT

In the oxide gas absorbing arrangement disclosed in the specification, metal foils having a thickness $\leq 0.05$ mm are coated with an oxide gas absorbing layer containing gamma aluminum oxide. One metal foil is corrugated and joined to a smooth foil and the combined foils are rolled into a cylinder to provide parallel gas passages in which exhaust gases are exposed to the oxide gas absorbing layer. To enhance absorption turbulence is created in the gas passages by twisting the cylinder to narrow and contort the individual passages.

16 Claims, 1 Drawing Sheet

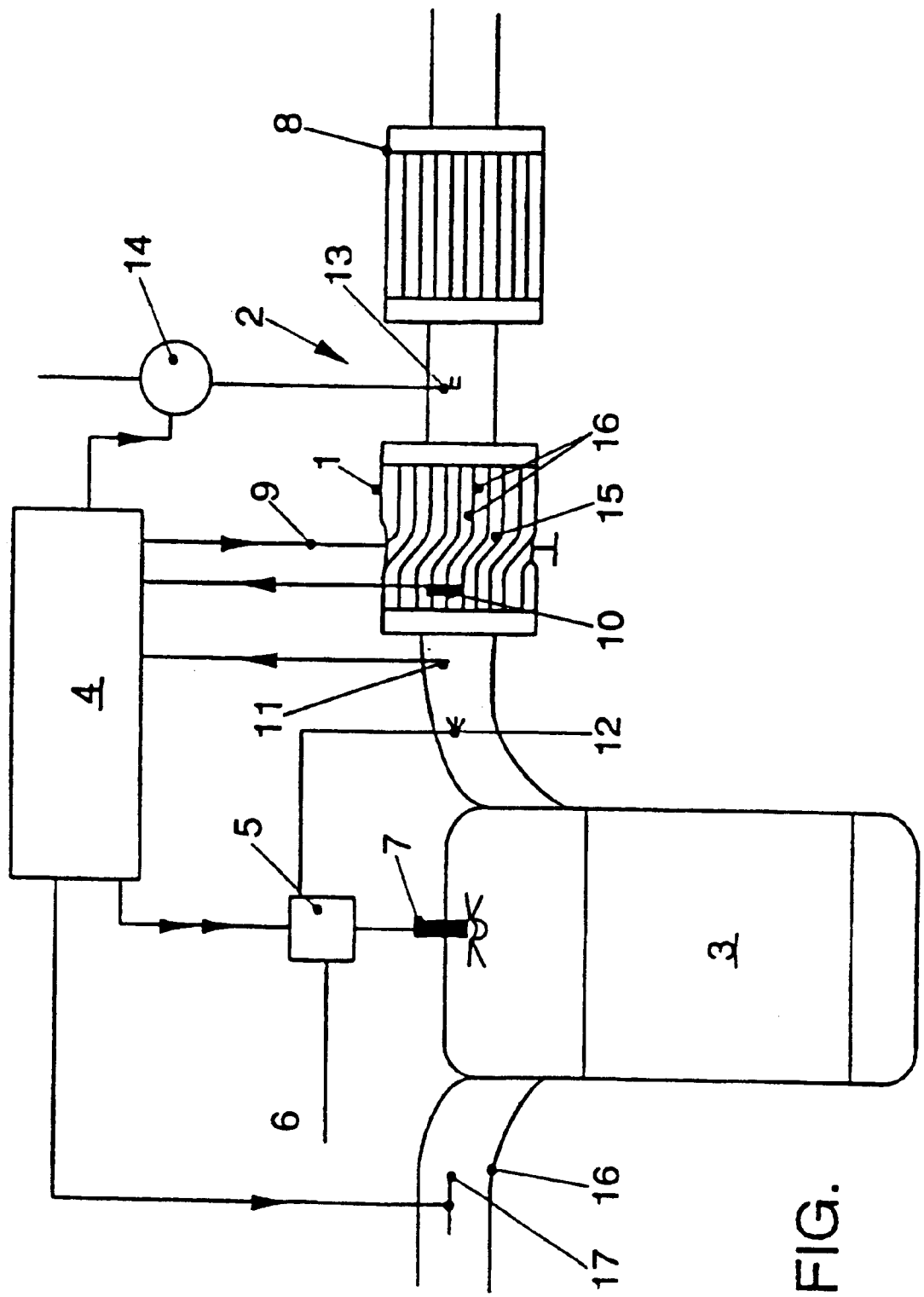

OXIDE GAS ABSORBING ARRANGEMENT AND METHOD

REFERENCE TO RELATED APPLICATION

This is a divisional of copending application Ser. No. 09/252,506 filed Feb. 18, 1999.

This application is a continuation of International Application No. PCT/EP97/04306, filed Aug. 7, 1997.

BACKGROUND OF INVENTION

This invention relates to absorbing arrangements and methods for temporarily storing oxides of nitrogen and sulfur and removing such oxides from the exhaust gas from internal combustion engines.

As used herein, the term "absorb" includes the chemical process for storing gases such as, for example, by conversion of barium oxide to barium nitrate for storage of nitrogen oxide.

U.S. Pat. No. 4,755,499 discloses an arrangement for the reversible storage of oxides of nitrogen and sulfur, for example from motor vehicle exhaust gases, in which the absorber is regenerated by heating in a reducing atmosphere. In this arrangement, a reduction of the nitrogen oxides takes place at the same time.

A storage catalyst of that type for use in motor vehicles is described in more detail in U.S. Pat. No. 5,402,641, in which high temperatures above 500° C. are necessary to regenerate the absorber. Consequently, use of the storage catalyst is possible only for motor vehicles having a high exhaust-gas temperature, in particular for motor vehicles with an Otto engine.

In this case, however, the possibility of use is limited since, under certain operating conditions of internal combustion engines, such as occur for example in city traffic, the acceleration phases cause a large emission of nitrogen oxide, but no long-lasting high temperature condition such as is required to regenerate the absorber, especially with respect to oxides of sulfur, is attained.

SUMMARY OF THE INVENTION

Accordingly, it is an object of the present invention to provide a method and arrangement for releasably absorbing oxides of sulfur and nitrogen which overcomes disadvantages of the prior art.

Another object of the invention is to provide an absorber for nitrogen oxides and a corresponding method, suitable especially for use with fuel consumption-optimized engines such as Diesel and/or direct injection Otto engines, in which regeneration of the absorber is possible even at low exhaust gas temperatures.

These and other objects of the invention are attained by providing an arrangement for absorbing oxide gases which includes an absorption layer for absorbing oxides of nitrogen and/or sulfur and a support for the absorption layer which has a wall thickness $\leq 0.16$ mm. The support preferably has a wall thickness $\leq 0.1$ mm and desirably $\leq 0.05$ mm. The support may be a metal sheet or foil and may be heatable by application of an electric current. Preferably the support is formed so as to provide flow passages with a structure arranged to make the flow turbulent. With this arrangement, regeneration of the absorber is possible even at very low exhaust gas temperatures such as occur for example in the case of direct injection Diesel engines.

According to the invention, the usual gas absorbing materials may be employed, for example as described in U.S. Pat. No. 4,755,499, and also in U.S. Pat. Nos. 5,402,641 and 5,362,463. A common feature of all these storage materials is that they have an elevated absorption temperature, while a still higher regeneration temperature is required especially for removing the oxides of sulfur. For most storage media of this kind, temperatures in the range from 150° to 700° C., in particular temperatures above 300° C., are required. Such temperatures commonly occur in motor vehicles with Otto engines, but are comparatively rare with Diesel engines and especially in internal combustion engines having direct fuel injection.

The preferred $NO_x$ storage materials are distinguished in that, under conditions of net oxidation, i.e., a stoichiometric excess of oxidizing agents, such as occurs in the exhaust gas during the operation, they will store nitrogen oxides and, upon a reduction of the excess of oxygen, may reduce them. For this purpose, the $NO_x$ storage catalysts usually include a precious metal, in particular the usual precious metal coatings for three-way catalysts. The $NO_x$-laden storage material is advantageously regenerated in a regenerating phase at $\lambda \leq 1$.

Ordinarily, various reactions take place successively or simultaneously on the $NO_x$ storage catalyst, the most important reactions being: oxidation of the NO in the exhaust gas to $NO_2$, storage of the $NO_2$ as nitrate, decomposition of the nitrate, and reduction of the re-formed $NO_2$ to nitrogen and oxygen.

As described above, the course of the reactions depends, among other things, not only on the temperature of the catalyst but also on the concentration of the reagents at the active region of the catalyst and the flow velocity of the gas.

According to the invention, it has now been found that, with various factors capable of being combined with each other, it is possible also, at little cost, to optimize the known exhaust-gas absorbers so that they may be employed for internal combustion engines with direct injection and for Diesel engines. For this purpose, the wall thickness of the supporting member on which the absorption layer is applied preferably should be $\leq 160$ microns, and desirably $\leq 140$ microns and if a metal support is used, a wall thickness $\leq 50$ microns, preferably $\leq 40$ microns, and desirably $\leq 30$ microns, and the absorber should preferably be heated to a temperature above the temperature of the exhaust gas.

According to the invention, it has been found that, with the use of thin-walled ceramic supports for the absorption layer, i.e. supporting members having a wall thickness $\leq 0.14$ mm, not only is a more rapid temperature rise of the absorption layer possible, but also a thicker absorption layer may be used. This accomplishes two objectives: in the first place, even short periods of high-temperature operation can be utilized for regeneration since the storage layer temperature will be increased to the required temperature more quickly, and in the second place, by providing a thicker absorption layer, a higher $NO_x$ or $SO_x$ storage capacity can be achieved so that during operation of the internal combustion engine a longer period of time can elapse before the storage layer must be regenerated. Consequently, despite the less frequent occurrence of temperature peaks in the exhaust gas of consumption-optimized internal combustion engines, no failure of the storage layer resulting from exceeding its storage saturation limit will occur.

According to the invention, absorbers having a support member made of metal foil are especially suitable, and the metal foil may advantageously be connectable to an electric power source for resistance heating so that, even at low exhaust gas temperatures, the absorber can be brought to the necessary regenerating temperature by passing an electric current through the metal support. Furthermore, by using a metal support member, the gas passages which are coated with the absorption layer may be variously shaped, so that, for example, a controlled turbulent flow vortex of the exhaust gas in the passages can be established.

With especial advantage, according to the invention, supports with a variety of passage segments may be used for the absorber where, for example, an intermediate segment of the passages is modified to produce a turbulent flow. This can be done, for example, by varying the passage cross-section, or by a twisting or distortion of the passages. In this way, the support may be adapted in a controlled way for especially favorable reaction conditions along the flow passages. Another special feature of the support, beside a possible variation in number of passages in the flow direction and the provision of changes of cross section along the flow direction, is the segmentation of the support where, for example, one segment with an absorption layer is disposed near the engine outlet and another segment with an absorption layer is located somewhat farther away. Thus, even with the most variable operating conditions, good $NO_x$ purification results can be obtained with fuel consumption-optimized engines.

According to the invention, it has been found that the $NO_x$ storage arrangement will have especially good absorption and desorption properties if the flow passages for the exhaust gas are distorted in an intermediate region to achieve a turbulent flow between an inlet region and an outlet region which do not have a distorted structure to produce turbulent flow. As a simple arrangement for generating such a turbulent flow, for example, a transition from a large to a small diameter in the passages is effective, but twisting of the entire support in an intermediate region will also serve to generate turbulence. The especially favorable properties resulting from such turbulent flow are presumably achieved by a division of the individual reaction steps required to reduce nitrogen oxides among the successive regions of the support, with a modified intermediate region affording better conditions for reaction than unmodified intermediate regions.

To produce especially good oxide gas conversions, the absorption layer has an enlarged surface area, that is, a total surface area that is substantially larger than the area of the surface of the support member on which it is coated. For this purpose, the absorption layer provides a surface area of at least 20 $m^2/g$, and preferably at least 40 $m^2/g$. Also, the absorption layer preferably has a pore volume of at least 0.2 $cm^3/g$, and desirably at least 0.4 $cm^3/g$, a bimodal pore size distribution with both micropores and macropores also being acceptable. This may be achieved for example by the choice of the size of the particles forming the absorber surface, in which mixtures or specified distributions of different particle sizes are also suitable.

An especially suitable absorption material is gamma-aluminum oxide containing one or more elements in the group consisting of alkali metals, alkaline-earth metals, rare earths and/or lanthanum. The presence of the elements copper and manganese is also suitable. The added elements are usually present as oxides, or else as carbonates or nitrates, the storage effects being achieved by formation of corresponding nitrates and sulfates, which are then converted back to oxides or carbonates under the appropriate reaction conditions. In this way, it is possible to absorb $NO_x$ and/or $SO_x$ from an exhaust gas containing at least 1% oxygen.

As described above, the absorbed substances are desorbed from the storage catalyst layer by elevated temperatures and in a reducing atmosphere. For this purpose, it is desirable to determine the oxygen concentration in the exhaust gas so that the oxygen concentration, or a quantity having a known relationship to the oxygen concentration, can be utilized to control the process of absorption or desorption.

Since the temperature of the absorption layer, determined directly or indirectly, is also important the same consideration is also applicable to the temperature of the exhaust gas. Thus, the absorption layer temperature may for example be determined by measuring the temperature of the exhaust gas or of the support member. A determination of temperature over the operating diagram of the internal combustion engine is also possible.

With the present invention, absorption layers having a thickness of at least 50 microns, preferably at least 70 microns, and desirably at least 90 microns, can be provided. These values are average layer thickness of a cross section and should extend over preferably at least 50% and desirably at least 80% of the total absorber. The foregoing absorbtion layer thickness values apply to layers on ceramic substrates. Half of those values apply to absorbtion layers provided on metal substrates. Such high layer thickness values permit a greater storage capacity compared to conventional absorbers, and consequently permit longer intervals between regeneration as described above.

According to the method of the invention, regeneration of the absorbtion layer is preferably carried out when the operating conditions of the internal combustion engine produce a correspondingly high temperature of the exhaust gas and hence of the absorption layer. Especially advantageous, however, is a method in which supplementary heating of the absorption layer is provided, preferably electrically. Other possible heating procedures include ignition control measures in Otto engines, variation of lambda, lowering of lambda below 1, and addition of secondary air to generate exothermia on an oxidation catalyst, and/or an exhaust ignition arrangement, as well as heating the catalyst with a burner. A segmented absorber in which the segments are heated according to the required reaction is especially advantageous. Thus, for example, only one absorber segment located in a downstream exhaust flow direction may be heated, especially in case of a distinct spatial separation of the absorber segments. Electric heating is especially advantageous in this case, but an injection of fuel into the exhaust gas and/or a burner may also be used. By arranging individual segments for individual reactions at different distances from the engine exhaust manifold, thermal aging of the absorber may be reduced in addition to providing the advantage of especially favorable reaction temperatures in individual absorber segments.

Further, by heating the absorber such as electrically or by means of a burner, a soot deposit on the absorber which would otherwise definitely reduce the storage capacity can be burned off. For this purpose, the adjustment of the lambda in the exhaust gas flow to a value not over 1 is preferably performed after burning off the carbon deposits.

Since the release and conversion of the $NO_x$ from the storage layer and the release of the oxides of sulfur from the storage layer require different temperatures, higher in the case of the sulfur oxides, it is also possible to proceed so that a desorption of the oxides of sulfur, which are present in particular as sulfate is performed at longer time intervals or only as needed, so that the storage layer is only occasionally heated to the high temperatures needed for desorption of the sulfur oxides. This counteracts premature aging of the storage layer, so that an especially good long-term stability of the absorber is achieved. This procedure may be used with the absorber arrangement and method described above.

BRIEF DESCRIPTION OF THE DRAWING

Further objects and advantages of the invention will be apparent from a reading of the following description in conjunction with the accompanying single drawing illustration which shows schematically a representative embodiment of an exhaust gas absorbing arrangement according to the invention.

DESCRIPTION OF PREFERRED EMBODIMENTS

In the typical embodiment of the invention shown in the drawing an absorber 1 of oxide gas components is mounted in an exhaust line 2 of an internal combustion engine 3 the operation of which is controlled by a motor control unit 4. The motor control unit 4 controls an injection pump 5 delivering fuel from a tank 6 (not shown) to a fuel injection nozzle 7. For the sake of clarity, the numerous conventional control lines for fuel and air supply and discharge and the like leading to the motor control unit 4 are not shown.

In the illustrated exhaust line 2 a three-way catalyst 8 is mount downstream from the absorber 1 but it is also possible to locate the three-way catalyst 8 upstream from the absorber 1.

In this embodiment, the absorber 1 is made from two metal foils one of which is smooth and the other of which is corrugated and is connected to the smooth foil by soldering at the corrugation crests. By rolling this multilayer foil together, a cylindrical member having a plurality of coaxial passages is provided. In addition, the support member of the absorber has an intermediate region 15 which is twisted about its longitudinal axis, so that the individual passages 16 in the intermediate region are narrowed and contorted to produce turbulence in the exhaust gases flowing through the passages. A similar turbulence-generating structure in the intermediate region may also be achieved by providing transverse corrugations in one or both of the metal foils.

The metal foil material contains a few percent of aluminum and is anodized so that a "wash coat" containing gamma-aluminum oxide will adhere better to the metal foil surface. The aluminum oxide wash coat further contains one or more of the elements sodium, barium, cerium and lanthanum, providing a layer on the aluminum oxide containing the salts, ie., nitrates, oxides and hydroxides of those elements. By impregnating the wound support foils with the wash coats and then firing, the absorbing layer with those salts is produced. Additionally, the absorbing layer is impregnated with a solution containing salts of the precious metals platinum and rhodium and possibly palladium in addition to or instead of the rhodium, from which the corresponding precious metals are then liberated during firing. The resulting precious metal coating provides a three-way catalyst. The oxide gas absorber is provided with an electrical contact 9 and mounted in a housing so that an electric current can be passed through the foils and the absorbing layer to a grounded housing. The electrical contact 9 is connected to the control unit 4, and a temperature sensor 10, also connected to the control unit 4, is mounted inside the housing.

Upstream from the absorber 1, a broad-band lambda probe 11 inserted in the exhaust gas pipe, provides signals which are proportional to the oxygen concentration present in the exhaust gas to the control unit 4. In addition, a fuel injector 12 is mounted upstream from the lambda probe 11 and is supplied with fuel on instructions from the control unit 4. Between the absorber 1 and the following catalyst 8, an air injector 13 is provided, receiving air from a pump 14 controlled by the control unit 4.

The internal combustion engine 3 is a Diesel-type engine with direct injection, producing exhaust gas which normally has a large excess of oxygen and a temperature of about 200° to 400° C. in operation of the Internal combustion engine, nitrogen oxides and oxides of sulfur present in the exhaust are absorbed by the absorption layer of the absorber 1 in the form of nitrates and sulfates of sodium, barium, lanthanum and the like, while at the same time any oxidizable constituents present, mostly hydrocarbons, are oxidized by the precious metal coating of the absorber 1.

When the saturation limit of the absorbing layer in the absorber 1 is reached, or else at predetermined time intervals or in response to other control parameters, such as for example a determination of $NO_x$ in the exhaust following the absorber, the absorber is regenerated, i.e. freed from the $NO_x$, incorporated for example as barium nitrate. At the same time, oxides of sulfur, incorporated for example as barium sulfate, may be removed as well. For this purpose, the control unit 4 determines by way of the temperature sensor 10 whether the temperature of the absorber coating is high enough for regeneration of the absorber layer.

If the absorber coating temperature is below 500° C., the fuel injector 12 injects fuel into the exhaust, which is catalytically burned with the oxygen present in the exhaust gas on the precious metal coating of the absorber 1, raising its temperature. Alternatively and/or additionally, the metallic support for the absorber 1 can be electrically heated by a flow of current through the terminal 9. Still other arrangements for increasing the absorber temperature, as for example inductive heating of the metallic support and/or a throttling of the exhaust are possible.

As soon as the absorber 1 is heated sufficiently, a rich mixture is set in the exhaust gas, i.e. by the fuel injector 12. Preferably a throttle 17 is adjusted in the intake duct 16 of the combustion engine 3 by the control unit 4 so that less air is supplied to the internal combustion engine 3. This decreases the proportion of oxygen in the exhaust gas so that $NO_x$ and $SO_x$ are released from the absorption layer and are reduced. Termination of the regeneration may be time-controlled or else controlled by detecting the loss of exothermia effect of the reaction on the exhaust temperature. In a further modification, the regeneration may take place as described in United U.S. Pat. No. 5,406,790 in which the exhaust gas flow is throttled ahead of the absorber and is directed to the absorber through a by-pass.

To convert any hydrocarbons that may remain in the exhaust gas, an air injector 13 located downstream of the absorber 1 is activated by the control unit 4 during the fuel injection by the fuel injector 12. In this way, any hydrocarbons still remaining are oxidized to carbon dioxide and water in the downstream catalyst 8.

The arrangement described above may be used with an eddy-chamber Diesel engine. For Otto engines with direct injection, the throttle 17 as well as the fuel injector 12 may be omitted, since in that case the fuel injector 7 in the combustion chamber of the engine can enrich the exhaust gas sufficiently. In principle, however, operation in the same manner as the Diesel engine is also possible with an Otto engine.

Since the output of the engine 3 may be reduced during regeneration of the absorbing layer, the system may be arranged so that, when the engine is operating at full power, regeneration may be suppressed at least for a certain length of time.

Although the invention has been described herein with reference to specific embodiments, many modifications and variations therein will readily occur to those skilled in the art. Accordingly, all such variations and modifications are included within the intended scope of the invention.

I claim:

1. A method for removing at least one nitrogen oxide ($NO_x$) from the exhaust gas of an internal combustion engine, comprising the steps of:

(a) operating an internal combustion engine to produce an exhaust gas flow containing oxygen;

(b) passing exhaust gas containing oxygen over an oxide gas absorbing layer on a support member having a wall thickness $\leq 160$ microns;

(c) storing the $NO_x$ in the absorbing layer;

(d) heating the absorbing layer to a predetermined temperature of at least 500° C. during the operation of the engine;

(e) forming an exhaust gas from the internal combustion engine which is poor in oxygen and/or an exhaust gas having a stoichiometric excess of a reducing agent;

(g) desorbing the $NO_x$ from the absorbing layer and reducing the $NO_x$ in the exhaust gas which is poor in oxygen or has a stoichiometric excess of reducing agent while the absorbing layer is at a temperature equal to or above the predetermined temperature;

(h) forming an exhaust gas flow containing oxygen;

(i) terminating heating of the absorbing layer to the predetermined temperature; and (j) repeating steps (c) through (h).

2. A method according to claim 1 wherein the support member is a ceramic member.

3. A method according to claim 1 wherein the support member is a metal foil.

4. A method according to claim 1 wherein the step of heating the absorbing layer is carried out by at least one step from the group consisting of (a) injecting fuel into the exhaust gas and producing catalytic combustion, (b) altering the operating condition of the engine, (c) electrical heating of the absorbing layer and (d) heating the exhaust gas with a burner.

5. A method according to claim 4 wherein, before the step of heating of the absorbing layer to a predetermined temperature of at least 500° C. during the operation of the engine, a step of determining whether a temperature representative of the temperature of the absorbing layer is at or above the predetermined temperature is carried out; and if it is determined that the temperature representative of the temperature of the absorbing layer is equal to or above the predetermined temperature, the steps of heating the absorbing layer at least to the predetermined temperature during the operation of the engine and terminating the heating the absorbing layer at least to a predetermined temperature during the operation of the engine are omitted.

6. A method for removing at least one nitrogen oxide ($NO_x$) from the exhaust gas of an internal combustion engine comprising the steps of:

(a) operating the engine to produce an exhaust gas flow containing oxygen;

(b) passing exhaust gas containing oxygen over an absorbing layer on a support member having a wall thickness $\leq 160$ microns;

(c) storing the $NO_x$ in the absorbing layer;

(d) determining whether a temperature representative of the temperature of the absorbing layer is equal to or above a predetermined temperature of at least 500° C.;

(e) forming an oxygen-poor exhaust gas flow and/or an exhaust gas flow with a stoichiometric excess of reducing agent while the absorbing layer is at a temperature equal to or above the predetermined temperature;

(f) desorbing the $NO_x$ from the absorbing layer and reducing the $NO_x$ in the oxygen-poor exhaust gas and/or in the exhaust gas flow having a stoichiometric excess of reducing agent while the absorbing layer is at a temperature equal to or above the predetermined temperature;

(g) forming an exhaust gas containing oxygen; and (h) repeating steps (c) through (g).

7. A method according to claim 6 wherein the support member is a ceramic member.

8. A method according to claim 6 wherein the support member is a metal foil.

9. A method according to any one of claims 1–8 including storing at least one oxide of sulfur ($SO_x$) in the absorbing layer and desorbing the oxide of sulfur from the absorbing layer.

10. A method according to any one of claims 1–8 wherein the step of desorbing the $NO_x$ from the absorbing layer is carried out at timed intervals.

11. A method according to any one of claims 1–8 wherein the step of desorbing the $NO_x$ from the absorbing layer is carried out based on the $NO_x$ content of the absorbing layer.

12. A method according to any one of claims 1–8 wherein the absorbing layer contains gamma-aluminum oxide and at least one element from the group consisting of (a) alkali metals, (b) alkaline-earth metals, (c) rare earths and (d) lanthanum.

13. A method according to any one of claims 1–8 wherein the exhaust gas is passed turbulently over the absorbing layer.

14. A method according to any one of claims 1–8 wherein the exhaust gas is passed through a support member having a plurality of parallel gas passages containing the absorbing layer.

15. A method according to claim 14 wherein the exhaust gas is passed through a plurality of support members having the absorbing layer in which the plurality of support members have a different number of passages and/or passages with different flow diameters and/or are spaced at least 50 cm from each other.

16. A method according to claim 14 wherein the exhaust gas is passed over a support member bearing the absorbing layer which has curved passages.

* * * * *